(12) United States Patent
Schnur et al.

(10) Patent No.: US 10,899,263 B2
(45) Date of Patent: Jan. 26, 2021

(54) CUPHOLDER ASSEMBLY

(71) Applicant: Faurecia Interior Systems, Inc., Auburn Hills, MI (US)

(72) Inventors: Brett Schnur, Farmington Hills, MI (US); Maxime Salandre, Rochester, MI (US); Nicholas Natale, Sterling Heights, MI (US)

(73) Assignee: FAURECIA INTERIOR SYSTEMS, INC., Auburn Hills, MI (US)

( * ) Notice: Subject to any disclaimer, the term of this patent is extended or adjusted under 35 U.S.C. 154(b) by 92 days.

(21) Appl. No.: 16/255,508

(22) Filed: Jan. 23, 2019

(65) Prior Publication Data

US 2020/0231077 A1    Jul. 23, 2020

(51) Int. Cl.
*B60N 3/10* (2006.01)
*B60N 3/08* (2006.01)
*B60R 7/04* (2006.01)

(52) U.S. Cl.
CPC .............. *B60N 3/101* (2013.01); *B60N 3/08* (2013.01); *B60R 7/04* (2013.01)

(58) Field of Classification Search
CPC .. B60N 3/08; B60N 3/10; B60N 3/101; B60R 7/04
USPC .............................................. 296/37.8, 24.34
See application file for complete search history.

(56) References Cited

U.S. PATENT DOCUMENTS

| 4,796,791 | A | 1/1989 | Goss et al. | |
| 4,848,627 | A | 7/1989 | Maeda et al. | |
| 5,791,617 | A * | 8/1998 | Boman | B60N 3/102 248/311.2 |
| 6,116,674 | A | 9/2000 | Allison et al. | |
| 6,349,913 | B1 * | 2/2002 | Jankowski | B60N 3/102 224/281 |
| 7,566,040 | B2 | 7/2009 | Lota et al. | |
| 7,784,843 | B2 | 8/2010 | Lota et al. | |
| 8,276,964 | B2 | 10/2012 | Werner et al. | |
| 8,322,671 | B2 * | 12/2012 | Myers | B60N 3/108 248/311.2 |
| 9,428,092 | B2 | 8/2016 | Bosma et al. | |
| 9,981,589 | B2 | 5/2018 | Senda | |
| 2008/0079278 | A1 | 4/2008 | Rajappa et al. | |
| 2015/0375685 | A1 * | 12/2015 | Krishnan | B60R 11/0252 296/24.34 |

FOREIGN PATENT DOCUMENTS

| CN | 206797271 U | 12/2017 |
| DE | 10138292 A1 | 3/2003 |
| EP | 1894786 A2 | 3/2008 |

* cited by examiner

*Primary Examiner* — Jason S Daniels
(74) *Attorney, Agent, or Firm* — Reising Ethington P.C.

(57) ABSTRACT

A cupholder assembly for storing waste in a vehicle. The cupholder assembly includes a cup compartment having a cup supporting surface configured to support a cup stored in the cup compartment. The cup supporting surface includes an opening area which provides access to a storage compartment for waste. The storage compartment is slidably stowable beneath the cup compartment. The storage compartment can include a waste bag attachment mechanism for convenient storage and removal of waste. The cupholder assembly may be integrated with a vehicle center console.

14 Claims, 3 Drawing Sheets

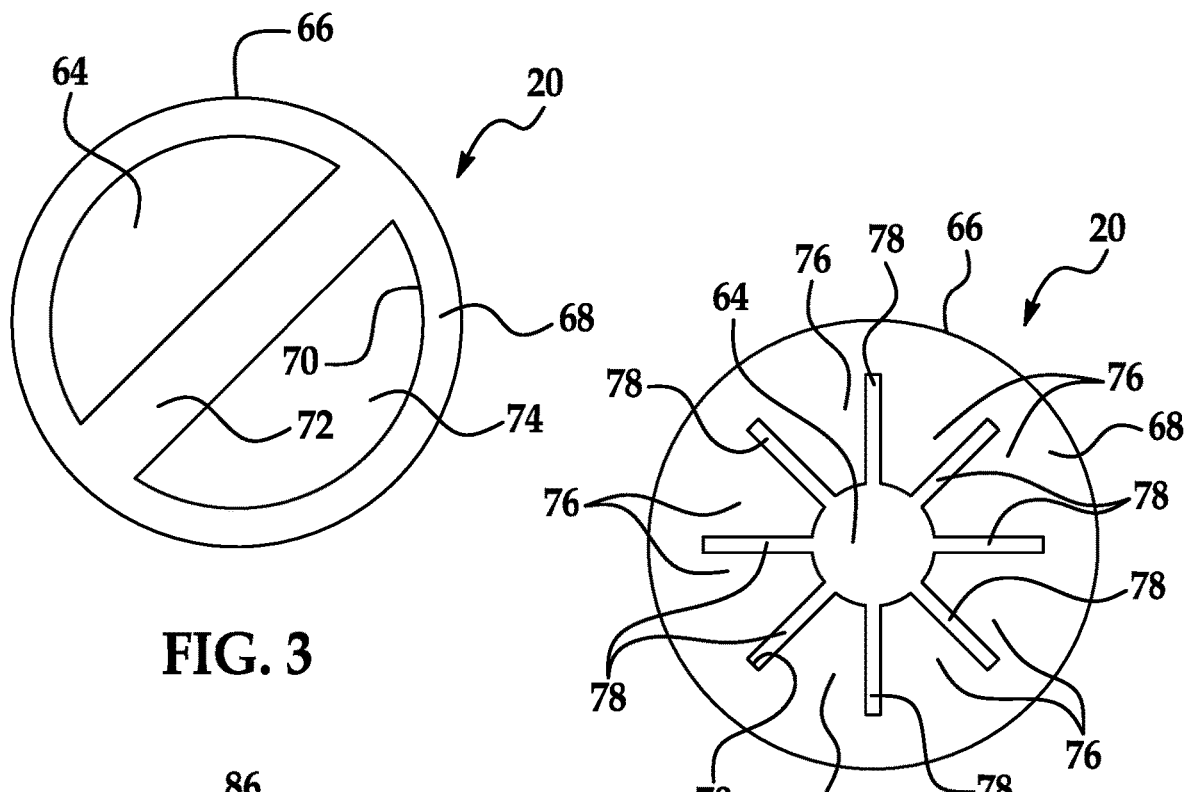
FIG. 3
FIG. 4
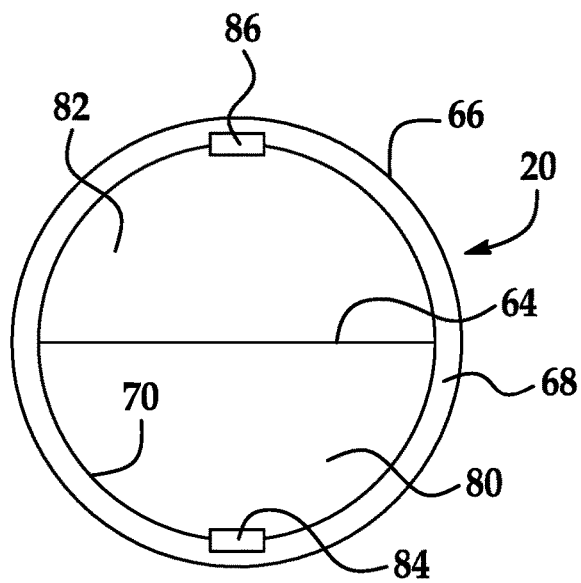
FIG. 5
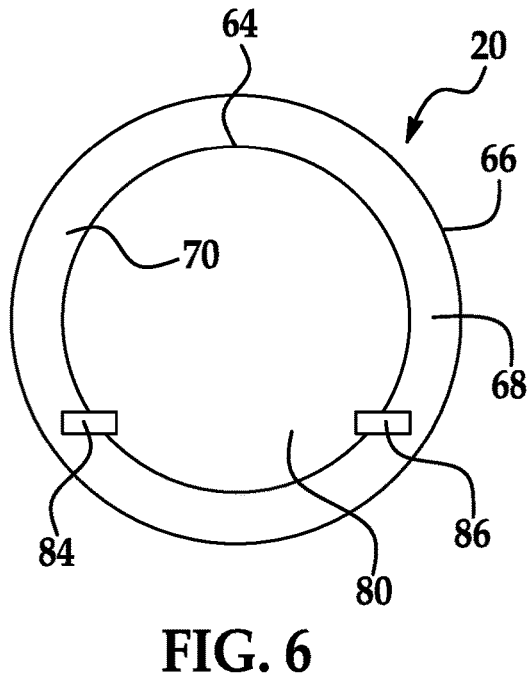
FIG. 6

CUPHOLDER ASSEMBLY

TECHNICAL FIELD

The invention relates to vehicle cupholder assemblies and methods of storing waste using cupholder assemblies.

BACKGROUND

Storage of waste in vehicles oftentimes involves the use of trash boxes on the floor and/or hanging exposed trash bags inside the vehicle interior. Trash boxes on the floor take up space in foot wells and can be an inefficient usage of the vehicle interior area. Exposed trash bags may become projectiles or may take away from the aesthetic appeal of the interior. Additionally, cupholders are frequently used for waste disposal. This is convenient in some vehicles having numerous cupholders—some larger vehicles having up to 21 cupholders or more. However, waste storage in the cupholders themselves can expose the waste stored therein to the vehicle environment than more closed-off storage options.

U.S. Pat. No. 7,566,040 to Lota is directed to a vehicle center console having a storage bin beneath a cupholder. With this center console, however, access to the storage bin requires removal of the entire cupholder unit. This results in a user having to dispose of waste in the storage bin using two hands, which may be undesirable. Alternatively, it may require setting the cupholder unit next to the center console before disposing of waste in the storage bin, thereby requiring an extra step in the waste disposal process if a user can only use one hand for waste disposal. This alternative would also likely require a user of the vehicle to set the waste on another vehicle surface while opening access to the storage bin beneath the cupholder unit.

SUMMARY

In accordance with an embodiment, there is provided a cupholder assembly for a vehicle, comprising: a cup compartment having a cup supporting surface configured to support a cup stored in the cup compartment, wherein the cup supporting surface includes an opening area; and a storage compartment, wherein the storage compartment is accessible through the opening area in the cup supporting surface of the cup compartment.

In some embodiments, the storage compartment is slidably stowable beneath the cup compartment.

In some embodiments, the cup supporting surface includes a perimeter rim.

In some embodiments, the cup supporting surface includes a support bar spanning a diameter of the perimeter rim.

In some embodiments, the cup supporting surface includes a plurality of support wedges extending from the perimeter rim.

In some embodiments, the plurality of support wedges create the opening area and a plurality of radially extending expansion lines between each of the plurality of support wedges.

In some embodiments, the cup supporting surface includes a flap hingedly attached to the perimeter rim.

In some embodiments, the cup supporting surface includes a second flap hingedly attached to the perimeter rim, wherein the opening area is located between the flap and the second flap.

In some embodiments, a waste bag attachment mechanism is attached to an inner wall of the storage compartment.

In some embodiments, the waste bag attachment mechanism includes a first ridge spanning at least part of a first side of the storage compartment and a separate pair of inwardly curved ridges spanning at least part of a second side of the storage compartment.

In accordance with another embodiment, there is provided a center console assembly for a vehicle, comprising a cupholder assembly for a vehicle The cupholder assembly comprises a cup compartment having a cup supporting surface configured to support a cup stored in the cup compartment, wherein the cup supporting surface includes an opening area; and a storage compartment, wherein the storage compartment is accessible through the opening area in the cup supporting surface of the cup compartment. The center console assembly further includes a second storage compartment adjacent the cup compartment and the storage compartment.

In some embodiments, the storage compartment is configured to be slidably removable from a side wall.

In some embodiments, the storage compartment is configured to be slidably moved into the second storage compartment.

In some embodiments, a false floor at least partially covers the storage compartment when it is slidably moved into the second storage compartment.

In accordance with another embodiment, there is provided a method of storing waste in a vehicle, comprising the steps of: inserting waste through a cup compartment and through an opening in a cup supporting surface in the cup compartment and into a storage compartment; and removing the storage compartment by sliding the storage compartment out from beneath the cup compartment.

Various aspects, embodiments, examples, features and alternatives set forth in the preceding paragraphs, in the claims, and/or in the following description and drawings may be taken independently or in any combination thereof. For example, features disclosed in connection with one embodiment are applicable to all embodiments in the absence of incompatibility of features.

DESCRIPTION OF THE DRAWINGS

One or more embodiments will hereinafter be described in conjunction with the appended drawings, wherein like designations denote like elements, and wherein:

FIG. 3 is a top view of a cup supporting surface for a cupholder assembly in accordance with one embodiment;

FIG. 4 is a top view of a cup supporting surface for a cupholder assembly in accordance with another embodiment;

FIG. 5 is a top view of a cup supporting surface for a cupholder assembly in accordance with yet another embodiment;

FIG. 6 is a top view of a cup supporting surface for a cupholder assembly in accordance with yet another embodiment;

DETAILED DESCRIPTION OF EMBODIMENT(S)

Described herein is a cupholder assembly that can be used to store waste in a vehicle. The cupholder assembly and method of storing waste described herein can help optimize space usage in the vehicle interior, while providing a proper, easy to remove location for waste that is generally out of sight within the vehicle. In an advantageous embodiment, a storage compartment for waste is slidably located beneath a cup compartment designed to hold beverages, with access to the storage compartment being efficiently provided through an opening in one or more cup supporting surfaces of the cup compartment. This allows for quick, one-handed waste removal through the cup supporting surface of the cup compartment, which acts as a sort of lid for the waste storage compartment. The cupholder assembly can be associated with a vehicle center console having a second storage compartment adjacent the cup compartment and the waste storage compartment. Removal of the waste storage compartment can be easily accomplished by sliding the compartment out from underneath the cup compartment, whether through the storage compartment of the center console, or adjacent the passenger seat, to cite two examples.

Figure 1:
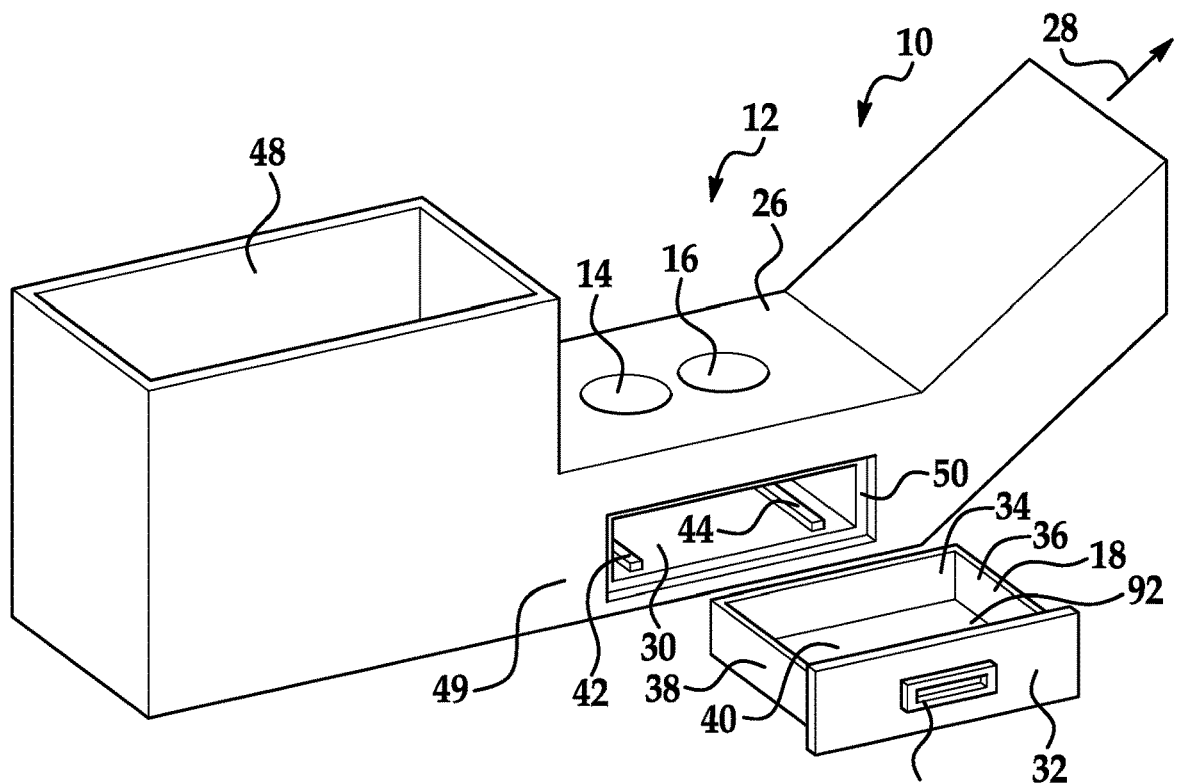
FIG. 1 is perspective view of a vehicle center console having a cupholder assembly in accordance with one embodiment.
Figure 2:
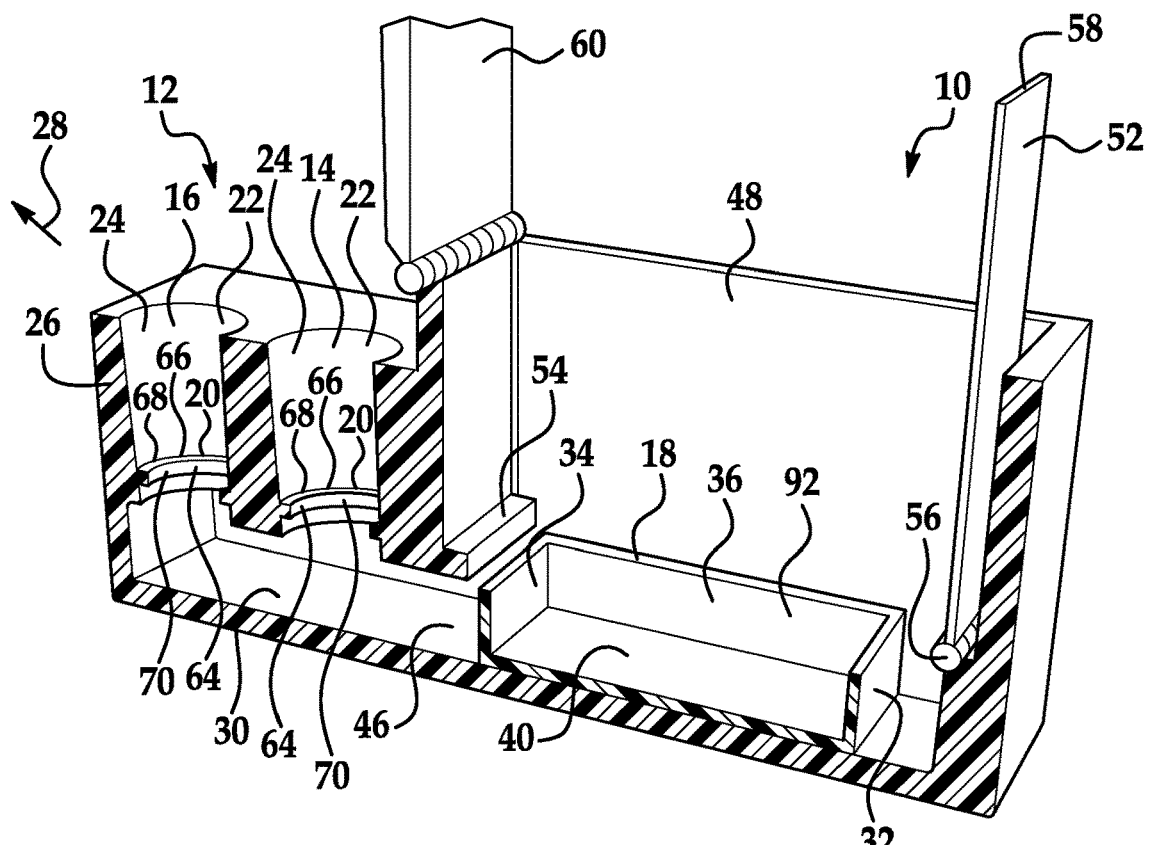
FIG. 2 is a cross-section view of a vehicle center console having a cupholder assembly in accordance with another embodiment.

FIGS. 1 and 2 illustrate embodiments of a center console 10 for a vehicle with a cupholder assembly 12. The cupholder assembly 12 includes cup compartments 14, 16 and a storage compartment 18 that can be used for waste storage and disposal. In this embodiment, the cup compartments 14, 16 include a cup supporting surface 20 which can provide efficient access to the slidably stowable storage compartment 18 located beneath the cup compartments 14, 16. In some embodiments, as illustrated, both cup compartments 14, 16 include the cup supporting surface 20 to provide access to the waste storage compartment 18. Alternatively, in other embodiments, only one cup compartment 14 provides access to the waste storage compartment 18, or more than two cup compartments provide access to the waste storage compartment. Various components of the cupholder assembly 12 may be manufactured from an injected molded plastic material, and may be co-molded together, or molded separately and then assembled. For example, as detailed below, the cup supporting surface 20 may be co-molded with the cup compartments 14, 16, along with other features of the cupholder assembly 12.

The cup compartments 14, 16 are illustrated as being associated with a center console 10; however, it is possible for the cup compartments and associated storage compartments to be located in other locations throughout the vehicle, such as in door panels, accessible to passengers in rear seats in the vehicle, etc. Each cup compartment 14, 16 has a lining 22, visible in the cross-section view of FIG. 2, which is a cylindrical wall 24 extending into a body 26 of the cupholder assembly. Other shapes, sizes, configurations, etc. for the cup compartments 14, 16 are certainly possible. For example, one cup compartment may be larger than another cup compartment to better accommodate beverage containers of varying sizes. In another example, the cup compartments 14, 16 may be oriented such that they are adjacent to each other with respect to the driver and passenger of the vehicle. The arrow 28 designates the direction to the front of the vehicle, and accordingly, instead of being in-line with respect to the longitudinal axis of the vehicle that extends from the front to the back, the cup compartments 14, 16 may aligned orthogonally with respect to the longitudinal axis of the vehicle so that one cup compartment is located closer to the vehicle driver than another cup compartment. In some embodiments, there may be only a single cup compartment located in the cupholder assembly 12, or there may be more cup compartments than what is illustrated in FIGS. 1 and 2. The configuration of the cup compartments 14, 16 may be at least partially dictated by the storage space requirements or limitations of the particular vehicle.

The storage compartment 18 can be slidably stowable with respect to the console 10 and/or the cup compartments 14, 16. Thus, the storage compartment 18 may slide out of the body 26 which acts as a housing for the storage compartment. In some embodiments, the body 26 includes a separate housing area 30 that generally encloses three or more sides 32, 34, 36, 38 of the storage compartment 18 when it is stowed under the cup compartments 14, 16. In an advantageous embodiment, the housing area 30 is located wholly beneath the cup compartments 14, 16. In FIG. 1, a bottom 40 of the storage compartment can include grooves (not shown) which slide on rails 42, 44 mounted in the housing area 30. Various track structures, opening/closing mechanisms, etc. may be included to help facilitate removal of the storage compartment 18 from the housing area 30 to allow removal of waste from the storage compartment. In the FIG. 2 embodiment, the bottom 40 slides along a bottom surface 46 of the housing area 30 and a second storage compartment 48.

With the embodiment of FIG. 1, when the storage compartment 18 is in a stowed position, the side 32, which has a larger face than the other sides, may rest against a receiving edge 50 to provide a better seal, which can help prevent waste smells from overwhelming the vehicle interior. This configuration allows the side 32 to be flush with a side wall 49 of the center console 10. When the storage compartment 18 is removed from the stowed position in the housing area 30, it can be pulled outwards towards the passenger of the vehicle, without interfering with the second storage compartment 48. With the embodiment of FIG. 2, when the storage compartment 18 is removed from the stowed position in the housing area 30, it slides toward the rear of the vehicle (opposite to the direction of arrow 28) and into the second storage compartment 48. In FIG. 2, a false floor 52 may be provided to block the housing area 30 from the remainder of the second storage compartment 48. This would prevent the storage compartment 18 from inadvertently sliding into items stored in the second storage compartment 48. The false floor 52 may rest upon a ledge 54, such that it is rotatably movable via hinge 56 between the position shown in FIG. 2 and a position in which a terminal end 58 of the false floor 52 rests upon the ledge 54. The ledge 54, in this embodiment, is situated as a projection from the housing area 30. Other features such as a lid 60 (partially shown in FIG. 2, and can also be used with the second storage compartment 48 of FIG. 1) and a handle 62 (shown in FIG. 1, and can also be used with the storage compartment 18 of FIG. 2) can be used to help facilitate stowage of the storage compartment 18. Moreover, other stowage positions and configurations for the storage compartment 18 are certainly possible, so long as it is possible to generally access waste stored in the storage compartment 18 for efficient removal, while keeping the main interior of the storage compartment 18 at least partially sheltered from the interior of the vehicle to minimize or lessen visually- and olfactory-related waste exposure.

To store waste in the vehicle, the cupholder assembly 12 allows for waste, trash, etc., to be inserted through one or more of the cup compartments 14, 16 and into the storage compartment 18. Then, as described above, the storage compartment 18 may be slid out from its stowed position beneath the cup compartments 14, 16, thereby providing access to the storage compartment for efficient removal of waste. In order to access the storage compartment 18 when it is stowed in the housing area 30 beneath the cup compartments 14, 16, one or more opening areas 64 are provided in the cup supporting surface 20. The opening areas 64 are regions where a cup, beverage, or the like would typically rest, but in the cupholder assembly 12, they are configured to provide access through to the storage bin 18.

FIGS. 3-6 illustrate top views of various example configurations for the cup supporting surface 20. In an advantageous embodiment, the cup supporting surface 20 includes a perimeter rim 66 that can define a circumferentially oriented support ledge 68. Accordingly, in some embodiments, the perimeter rim 66 can be generally flush with the wall 24 of the cup compartment 14, 16, or it may extend out from the wall 24 of the cup compartment 14, 16 to define the circumferentially oriented support ledge 68. With cups, bottles, etc., that are sized to have a circumference that is smaller than the circumference of the cylindrical wall 44, yet larger than an inner most circumference 70 of the circumferentially oriented support ledge 68, the outer circumference of the cup, bottle, etc. can easily be supported by the support ledge 68.

In FIG. 3, a support bar 72 is included to help further provide additional support for an item stored in the cup compartment 14, 16. The support bar 72 creates a second opening area 74 such that either open area 64, 74 can be used for waste disposal into the storage compartment 18. The support bar 72 provides additional area to the cup supporting surface 20 for accommodating a cup, bottle, etc. that is stored in the cup compartment 14, 16. This embodiment may also be advantageous from an economical standpoint, as it can be injection molded using the same, more rigid plastic material as the remainder of the cupholder assembly 12.

FIG. 4 shows another embodiment of a cup supporting surface 20. This embodiment includes a plurality of support wedges 76 that extend from the perimeter rim 66 and the circumferentially oriented support ledge 68. The plurality of support wedges 76 create the opening area 64 and a plurality of radially extending expansion lines 78 between each of the support wedges. In an advantageous embodiment, the cup supporting surface 20 is made from a more elastomeric material than the remainder of the cupholder assembly 12. This allows the plurality of support wedges 76 to extend toward the storage compartment 18 (i.e., into the page in FIG. 4) and create a larger opening area 64 for waste disposal.

FIGS. 5 and 6 show other embodiments of a cup supporting surface 20. In these embodiments, one or more flaps 80, 82 are used to create opening areas 64 for waste disposal into the storage compartment 18. Like the embodiment of FIG. 4, the flaps 80, 82 can be made from a more elastomeric material than the remainder of the cupholder assembly 12 to allow the one or more flaps 80, 82 to extend toward the storage compartment 18 (i.e., into the page in FIGS. 5 and 6) to dispose of waste in the opening area 64. With two flaps 80, 82, as shown in FIG. 5, each flap can be attached to the perimeter rim 66 and circumferentially oriented support ledge 68 with a hinge 84, 86, which connect flaps 80, 82, respectively. Each flap 80, 82 is generally sized to fill half of the area of the innermost circumference 70, creating the opening are 64 at the midline of the cup supporting surface. In FIG. 6, the single flap 80 is sized to fill the entire area of the innermost circumference 70. Two hinges 84, 86 are also used in this embodiment, but they are used at one half of the flap 80 so as to allow the opening area 64 to be formed at the opposite half of the flap. The hinges 84, 86 may be springladed to bias closure; they may be rotatable; and/or they may be a simple clasp or closure mechanism that does not promote movement one way or another. Thus, in some embodiments, other closure type elements may be used instead of, or in addition to, the hinges 84, 86, or only one hinge or closure type element may be used. The cup supporting surface 20 embodiments illustrated in FIGS. 5 and 6 may be desirable as they can provide an additional shield or barrier to block waste stored in the storage compartment 18 from being exposed to the vehicle interior cabin.

Figure 7:
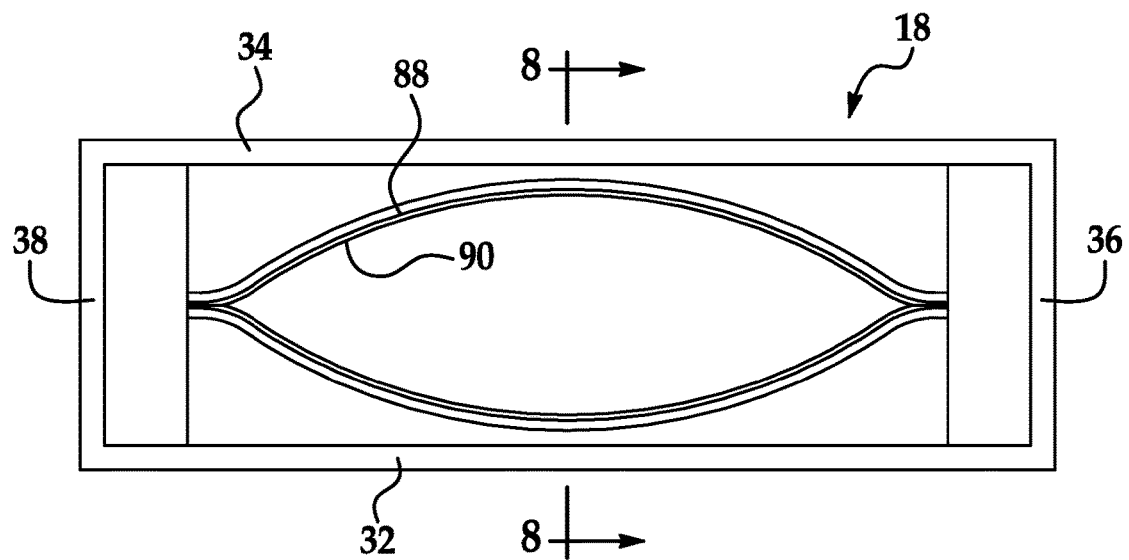
FIG. 7 is a top view of a storage compartment for a cupholder assembly in accordance with one embodiment.
Figure 8:
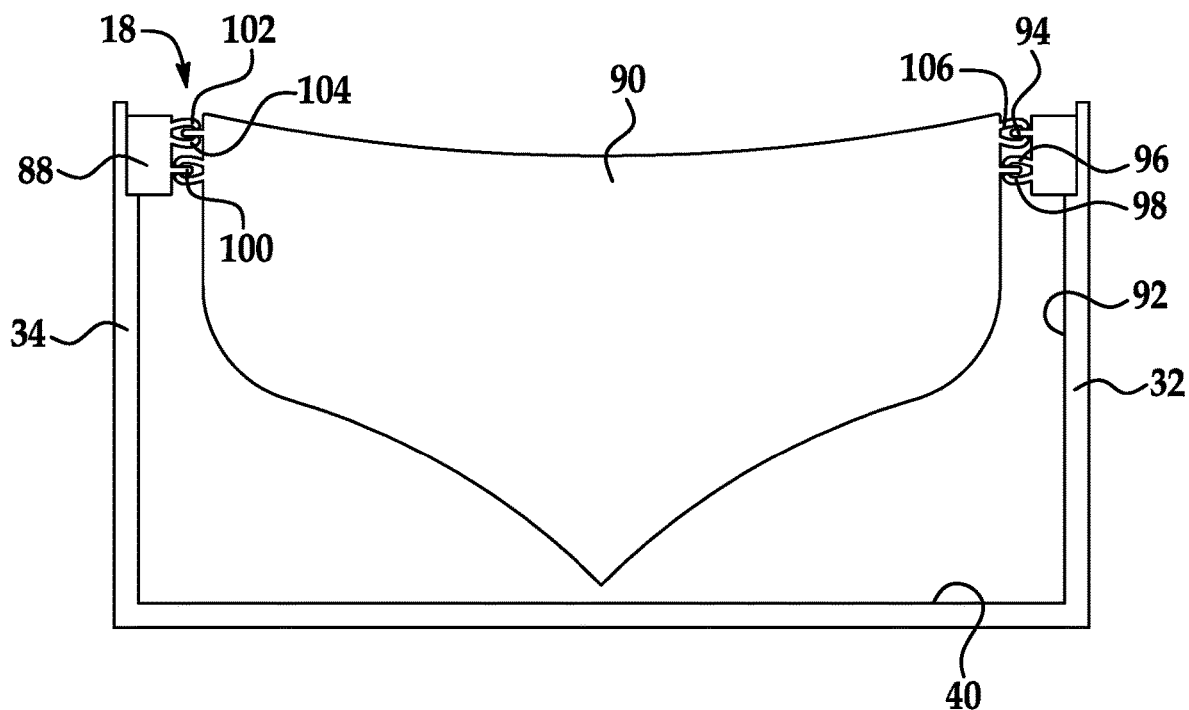
FIG. 8 is a cross-section view of the storage compartment of FIG. 7, taken through lines 8-8 in FIG. 7.

FIGS. 7 and 8 illustrate a waste bag attachment mechanism 88 for the storage compartment 18 that can be used in some embodiments. FIG. 7 is a top view of one embodiment of a storage compartment 18 which has a zip-top bag 90 installed using the waste bag attachment mechanism 88. FIG. 8 is a cross-section view of the embodiment illustrated in FIG. 7, taken along line 8-8 in FIG. 7. The zip-top bag 90 can be turned inside out and installed to the waste bag attachment mechanism 88. The waste bag attachment mechanism 88 can be mounted to (e.g., via a lid assembly or the like) or molded into an inner surface 92 of the storage compartment 18. The waste bag attachment mechanism 88 is not necessarily illustrated to scale, and in this embodiment, may be sized to accommodate variously sized zip-top bags 90 (e.g., gallon, quart, etc. depending on the size of the storage compartment 18).

In the illustrated embodiment, as shown in FIG. 8, the waste bag attachment mechanism 88 includes a first ridge 94 and a first pair of inwardly curving ridges 96, 98 toward the first side 32 of the storage compartment. Off of the second side 34 of the storage compartment 18, which is opposite the first side 32, a corresponding second ridge 100 and second pair of inwardly curving ridges 102, 104 is provided. The first ridge 94 directly opposes the second pair of inwardly curving ridges 102, 104, and the second ridge 100 directly opposes the first pair of inwardly curving ridges 96, 98. This allows the zip-top bag 90 to be easily mounted in the storage compartment 18, as the closure zip-top 106 of the zip-top bag 90 directly conforms to the waste bag attachment mechanism 88. As mentioned above, it should be noted that the ridges 94-104 are not necessarily illustrated to scale. In addition to the ridges 94-104, or as an alternative to the ridges, other types of waste bag attachment mechanisms are certainly possible, including one or more hooks, snaps, straps, folding ledges or recesses, etc.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A cupholder assembly for a vehicle, comprising:
   a cup compartment having a cup supporting surface configured to support a cup stored in the cup compartment, wherein the cup supporting surface includes an opening area; and
   a storage compartment and a waste bag attachment mechanism attached to the storage compartment, wherein the storage compartment is accessible through the opening area in the cup supporting surface of the cup compartment.

2. The cupholder assembly of claim 1, wherein the storage compartment is slidably stowable beneath the cup compartment.

3. The cupholder assembly of claim 1, wherein the cup supporting surface includes a perimeter rim.

4. The cupholder assembly of claim 3, wherein the cup supporting surface includes a support bar spanning a diameter of the perimeter rim.

5. The cupholder assembly of claim 3, wherein the cup supporting surface includes a plurality of support wedges extending from the perimeter rim.

6. The cupholder assembly of claim 3, wherein the cup supporting surface includes a flap hingedly attached to the perimeter rim.

7. The cupholder assembly of claim 6, wherein the cup supporting surface includes a second flap hingedly attached to the perimeter rim, wherein the opening area is located between the flap and the second flap.

8. The cupholder assembly of claim 1, wherein the waste bag attachment mechanism includes a first ridge spanning at least part of a first side of the storage compartment and a separate pair of inwardly curved ridges spanning at least part of a second side of the storage compartment.

9. The cupholder assembly of claim 1, further comprising a second storage compartment adjacent the cup compartment and the storage compartment.

10. The cupholder assembly of claim 9, wherein the storage compartment is configured to be slidably removable from a side wall.

11. A cupholder assembly for a vehicle, comprising:
    a cup compartment having a cup supporting surface configured to support a cup stored in the cup compartment, wherein the cup supporting surface includes an opening area, a perimeter rim, and a plurality of support wedges extending from the perimeter rim, wherein the plurality of support wedges create the opening area and a plurality of radially extending expansion lines between each of the plurality of support wedges; and
    a storage compartment, wherein the storage compartment is accessible through the opening area in the cup supporting surface of the cup compartment.

12. A cupholder assembly for a vehicle, comprising:
    a cup compartment having a cup supporting surface configured to support a cup stored in the cup compartment, wherein the cup supporting surface includes an opening area;
    a storage compartment, wherein the storage compartment is accessible through the opening area in the cup supporting surface of the cup compartment; and
    a second storage compartment adjacent the cup compartment and the storage compartment, wherein the storage compartment is configured to be slidably moved into the second storage compartment.

13. The cupholder assembly of claim 12, wherein a false floor at least partially covers the storage compartment when it is slidably moved into the second storage compartment.

14. A method of storing waste in a vehicle, comprising the steps of:
    inserting waste through a cup compartment and through an opening in a cup supporting surface in the cup compartment and into a storage compartment; and
    removing the storage compartment by sliding the storage compartment out from beneath the cup compartment.

* * * * *